June 6, 1933. J. M. MOBLEY 1,912,536
PLUMB OR LEVEL
Filed Nov. 23, 1929

INVENTOR.
Jeremiah M. Mobley
BY
ATTORNEY.

Patented June 6, 1933

1,912,536

UNITED STATES PATENT OFFICE

JEREMIAH M. MOBLEY, OF SAN FRANCISCO, CALIFORNIA

PLUMB OR LEVEL

Application filed November 23, 1929. Serial No. 409,343.

An object of this invention is to provide a level of the plumb bob type which has means for preventing the bob from loosely oscillating because of the flexibility of its supporting cord.

Figure 1:
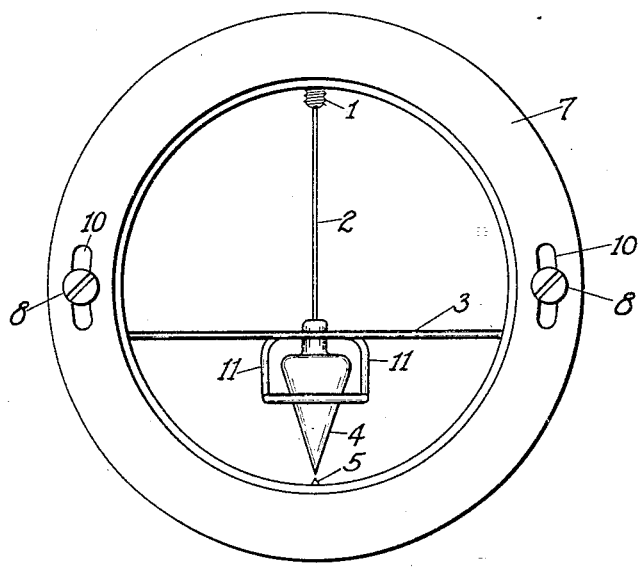
Fig. 1 represents an elevational view of the device.
Figure 2:
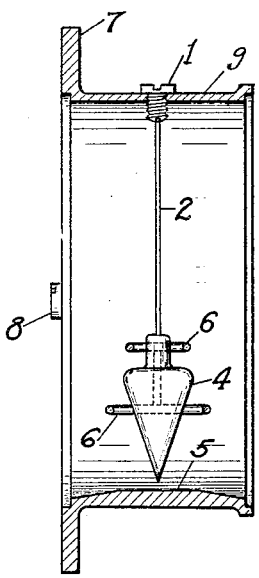
Fig. 2 represents a cross sectional view in elevation of the device.
Figure 3:
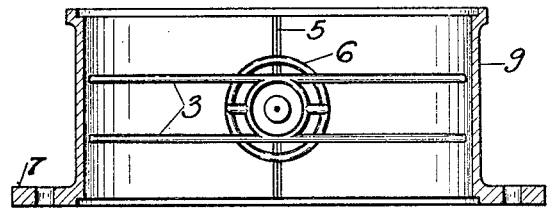
Fig. 3 represents a cross sectional view in plan of the device.

The device comprises a circular supporting rim 9 having a flange 7 and adapted to be supported within a suitable opening in a conventional level stock. The rim 7 has slots 10 therein, through which pass screws 8 for supporting the device in the said stock, the slots 10 permitting adjustment of the device about the center of rim 9.

Passing through a suitable opening in the top of the rim 9 is a screw 1 having depending from its inner end a flexible cord 2 which supports the plumb bob 4. The top of the plumb bob 4 cooperates with an index lug or ridge 5 on the rim 9 diametrically opposite to the screw 1.

Surrounding the plumb bob 4 is a crib 6 comprising an upper and a lower metal ring, as shown, which rings are joined by arcuate members 11. The crib is suspended from the rim 9 by means of two metal rods 3. It will be seen that this crib restrains the movements of the plumb bob, preventing undue oscillation and permitting the reading to be obtained much more readily.

What I claim is:

A level of the plumb bob type comprising; a cylindrical rim having an outwardly projecting flange at one end thereof; a supporting screw projecting inwardly from said rim; a cord suspended from said supporting screw; a plumb bob secured to said cord, said rim having an index lug thereon diametrically opposite the supporting screw, and with which said plumb bob is adapted to register; a crib adapted to surround a portion of said plumb bob to restrain same from undue oscillation, said crib consisting of an upper and a lower ring, arcuate members joining said rings and maintaining them in spaced relation, and suspending members secured to said crib and to said rim whereby said crib is maintained in position around said plumb bob.

JEREMIAH M. MOBLEY.